Patented Aug. 14, 1928.

1,680,908

UNITED STATES PATENT OFFICE.

HIROTARO NISHIDA AND KEIICHI SHIMADA, OF KIRIU, JAPAN.

METHOD OF PREPARING ARTIFICIAL PETROLEUM FROM RUBBER SCRAP OR VULCANIZED-RUBBER WASTE.

No Drawing. Application filed January 28, 1927, Serial No. 164,369, and in Japan December 24, 1925.

This invention relates to a method of preparing artificial petroleum and a decolorizing carbonaceous powder by the destructive distillation of a mixture of rubber scrap or vulcanized rubber waste and natural bleaching earths, i. e., Japanese acid earth, fuller's earth or Florida earth etc. The object of the invention is to obtain a complete substitute for natural petroleum and superior decolorizing, deodorizing and adsorptive carbonaceous substances.

More fully, very finely divided rubber scrap or vulcanized rubber waste is distilled under the ordinary pressure with two or three times its weight of one or more dehydrated natural bleaching earths, i. e. Japanese acid earth, fuller's earth, or Florida earth etc., in an iron retort and gradually heated, and the vapours obtained therefrom are condensed in a cooling apparatus. In this way there will be obtained a yellow raw distillate having a strong fluorescence and a petroleum odor, which is further submitted to a known fractional distillation by gradually raising the temperature and thus separated into gasoline, kerosene and heavy oil.

Example I.

1 kg. of vulcanized rubber waste is pulverized by means of a suitable crushing machine and this is mixed with 2 to 4 kgs. of dehydrated Japanese acid earth. The mixture is charged into an iron retort and heated. The decomposition of rubber occurs at a temperature below 100° C., and oil is distilled out from about 100° C., and above accompanied by water vapour, the distillation being finished at about 350° C. The distillate which corresponds to 60% by weight of the rubber waste used, consists of a mixture of various hydrocarbons having different boiling points and is analogous to the crude oil of the petroleum industry. The residue is a dry black carbonaceous powder which may be used for decolorizing and deodorizing purposes.

The above distillate is then subjected to fractional distillation and each of the fractions is refined by successively washing with a water solution of sulphuric acid, water solution of caustic soda and water. On fractionation, the distillate yields 30% of gasoline (below 150° C.), 50% of kerosene (150°–250° C.) and 20% of neutral heavy oils (above 250° C.), each by weight.

The process above described may be slightly modified; for example, the distillation is firstly carried out by a preliminary treatment which consists in converting the rubber scrap or vulcanized rubber waste into an oily liquid by distilling them alone in a retort. The distillates thus obtained are then mixed with, say, dehydrated Japanese acid earth in an iron retort so that this mixture is finally subjected to pyrogenetic distillation in the manner above described.

The distillation residue left in the retort is also dry black carbonaceous powder which is a superior decolorizing, deodorizing and adsorbing substance.

Example II.

1 kg. of crude distillate obtained by the dry distillation of finely divided vulcanized rubber waste is slowly dropped into 1 kg. of dehydrated Japanese acid earth and is covered with a further 1 kg. of dehydrated Japanese acid earth in an iron retort. The mixture is then gradually heated from 100° up to 350° C. Decomposition of rubber hydrocarbon takes place, an oily liquid distilling and leaving a black powdery residue consisting of the earth and carbon in the retort.

The distillate thus obtained corresponds to 85% of the crude distillate used. This is then subjected to fractional distillation and each of the fractions is refined in the same manner as in the first example. On fractionation, the yields are also quite same as the first example.

We claim:

1. A method of preparing a petroleum like material which comprises destructively distilling the hydrocarbons of rubber in the presence of a naturally occurring bleaching earth.

2. A method of preparing a petroleum like material which comprises destructively distilling the hydrocarbons of rubber in the presence of a bleaching earth chosen from the following, Japanese acid earth, fuller's earth, Florida earth.

3. A method of preparing a petroleum like material which comprises destructively distilling waste rubber in the presence of a bleaching earth chosen from the following, Japanese acid earth, fuller's earth, Florida earth.

In testimony whereof we affix our signatures.

HIROTARO NISHIDA.
KEIICHI SHIMADA.